R. KITSON.
Cotton-Opener.
No. 222,410.  Patented Dec. 9, 1879.
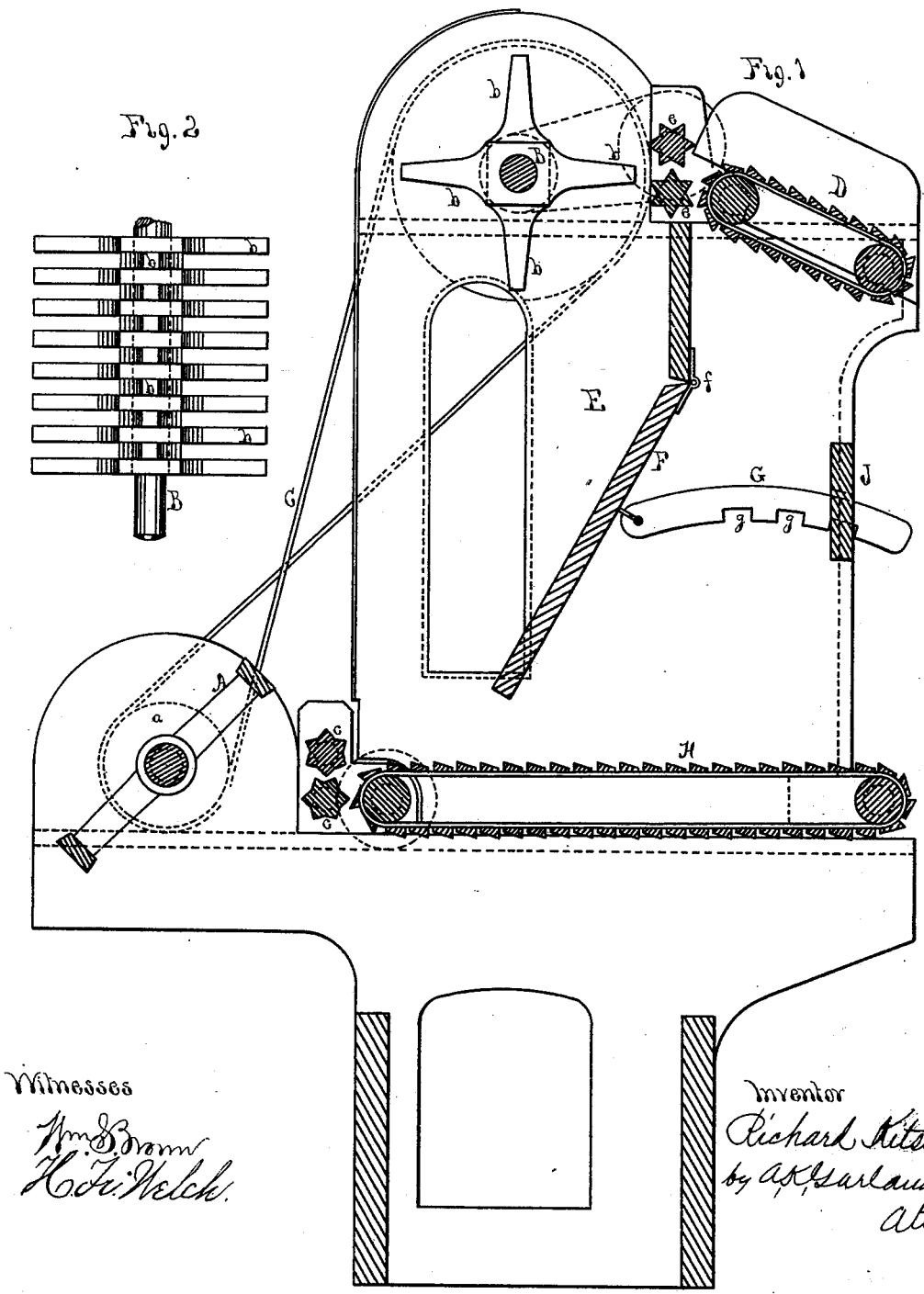

UNITED STATES PATENT OFFICE.

RICHARD KITSON, OF LOWELL, MASSACHUSETTS.

IMPROVEMENT IN COTTON-OPENERS.

Specification forming part of Letters Patent No. 222,410, dated December 9, 1879; application filed July 8, 1878.

*To all whom it may concern:*

Be it known that I, RICHARD KITSON, of Lowell, in the county of Middlesex and State of Massachusetts, have invented certain new and useful Improvements in Cotton-Openers, of which the following is a specification.

The object of my invention is to so improve upon the mechanism described in Letters Patent granted to me February 20, 1877, No. 187,538, as to deliver the cotton to the evening or gaging apparatus of the machine in a more perfectly subdivided condition, and to render the evening or gaging apparatus adjustable at pleasure for the passage of a greater or less quantity of fiber through it, and to cause the cotton to be delivered from it in a more perfect manner, by added attachments thereto, hereinafter described, without rolling or felting the fibers in the process of such delivery.

The nature of the invention will fully appear from the subjoined description, when considered with reference to the accompanying drawings, forming part of this specification.

In the drawings, in which similar letters of reference indicate like parts, Figure 1 is a sectional view of a portion of a cotton-opener with my improvements attached. Fig. 2 is a plan view of a portion of the breaking-shaft with the fingers or pins thereon.

A represents the beater, which is driven by the pulley $a$ and belt C from the shaft B. This shaft is provided with fingers or pins, whose operative sides are made so nearly radial to the shaft that the centrifugal force of the cotton operated upon by them will throw it off from and clear the fingers. To facilitate this action I construct the fingers very long, beginning them near the shaft, far within any point which can be reached by the cotton when the shaft is running, so that the current of air rushing outward from the shaft by its centrifugal force will pass outward along the smooth sides of the fingers and add to the motion of the cotton outward.

D represents the feed-apron, upon which the cotton is placed. $e\ e$ are the grasping-rolls, which take the cotton from the feed-apron, and, revolving at a very slow rate, hold it while it is struck by the fingers on the shaft B, which revolves much more rapidly.

The feed-apron D is provided with a ratchet-surface, which prevents the cotton from sliding back as it is carried along to the grasping-rolls $e\ e$.

E is the gage-box, into which the opened cotton falls. At the lower end of the box I place an endless apron, upon which the cotton rests. This apron carries the cotton equably and slowly along to the feed-rolls $c\ c$, which deliver it to the beater A.

As the density of the material to be opened varies greatly with different bales, it is desirable to increase or diminish the size of the box and the surface of the feed-apron at the bottom, on which the cotton rests, with the different thicknesses of lap required and the different material used. In order to accomplish this I attach the lower part, F, of the rear side of the box to the stationary part by means of a hinged joint, $f$. The swinging portion F may be held in any convenient manner, as by the arm G, having the notches $g\ g\ g$, which engage with the cross-piece J.

The grasping-rolls $e$ may be driven by a belt, as shown in the drawings by the dotted lines, or by being geared or belted to any convenient shaft, as may be most desirable.

I claim as new and of my invention—

1. In combination with the grasping-rolls $e\ e$ and breaker-shaft B, provided with fingers $b\ b$, the gage-box E, substantially as described.

2. In combination with the gage-box E, having the adjustable side F, the apron H, feed-rolls $c\ c$, and beater A, substantially as described.

3. The combination of the grasping-rolls $e\ e$, breaker-shaft B, provided with fingers $b\ b$, gage-box E, ratchet-faced apron H, and feed-rolls $c\ c$, substantially as described.

4. In combination with the feed-rolls $c\ c$, gage-box E, and beater A, the ratchet-faced apron H, substantially as described.

5. The combination of the gage-box E, the apron H, and the feed-rolls $c\ c$, substantially as described.

RICHARD KITSON.

Witnesses:
HENRY FR. WELCH,
A. K. GARLAND.